Feb. 28, 1956  E. M. DURAND  2,736,467
FERTILIZER SPREADER, INCLUDING VARIABLE SPEED AUGER
Filed Feb. 19, 1952  3 Sheets-Sheet 1
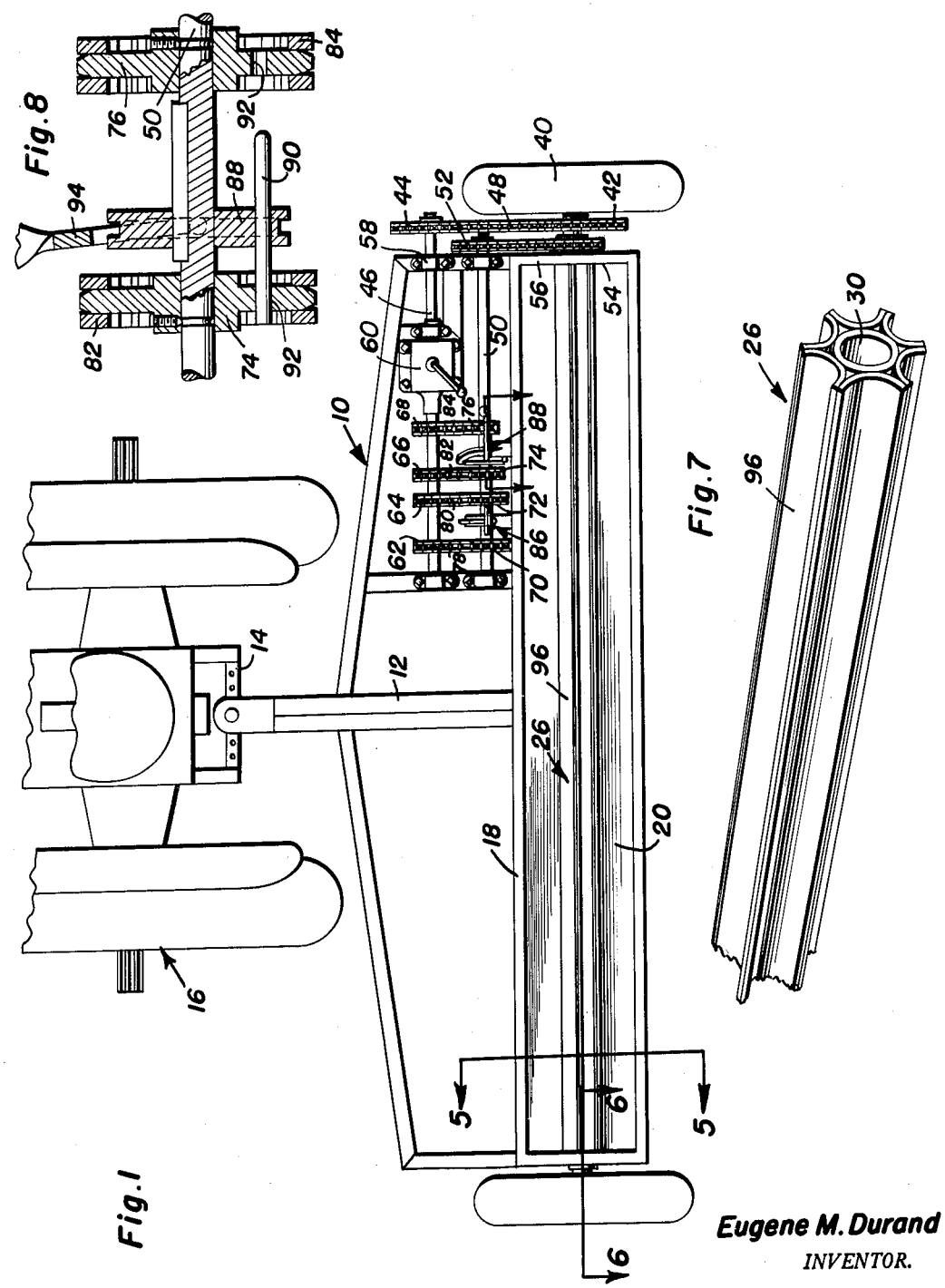
Eugene M. Durand
INVENTOR.

Feb. 28, 1956  E. M. DURAND  2,736,467
FERTILIZER SPREADER, INCLUDING VARIABLE SPEED AUGER
Filed Feb. 19, 1952  3 Sheets-Sheet 2
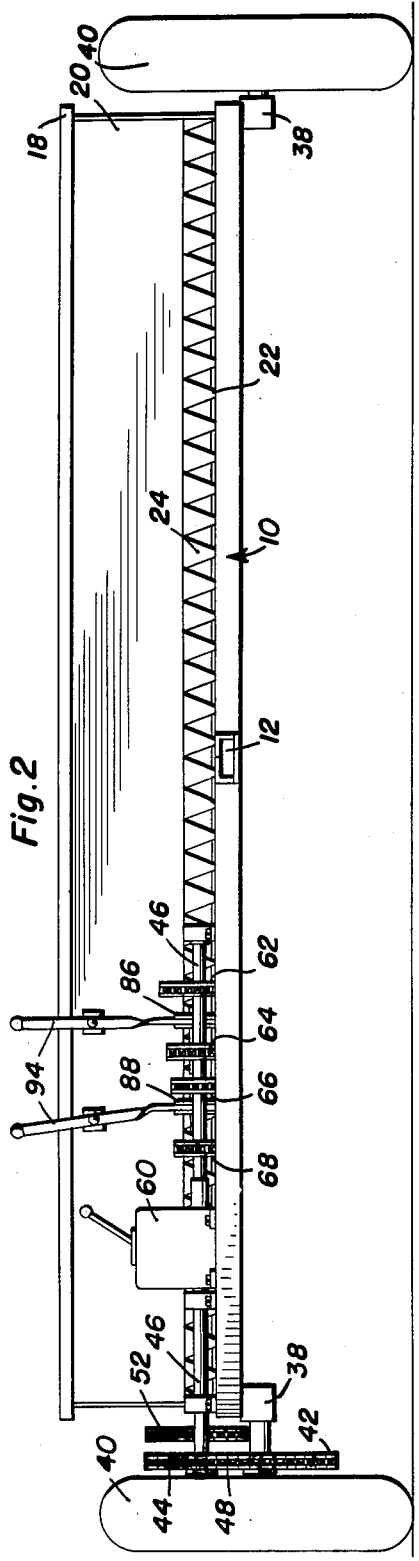
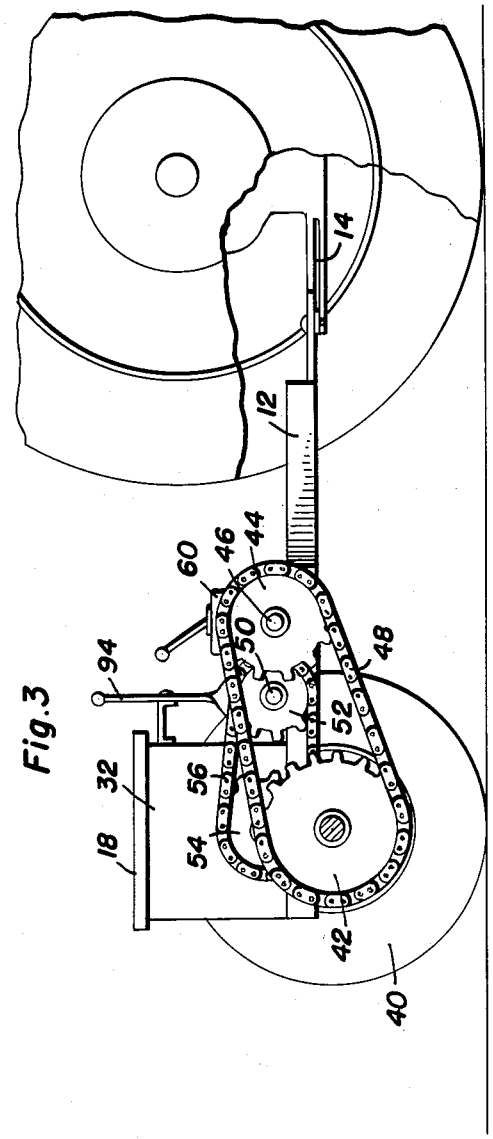
Eugene M. Durand
INVENTOR.

Feb. 28, 1956     E. M. DURAND     2,736,467
FERTILIZER SPREADER, INCLUDING VARIABLE SPEED AUGER
Filed Feb. 19, 1952     3 Sheets-Sheet 3
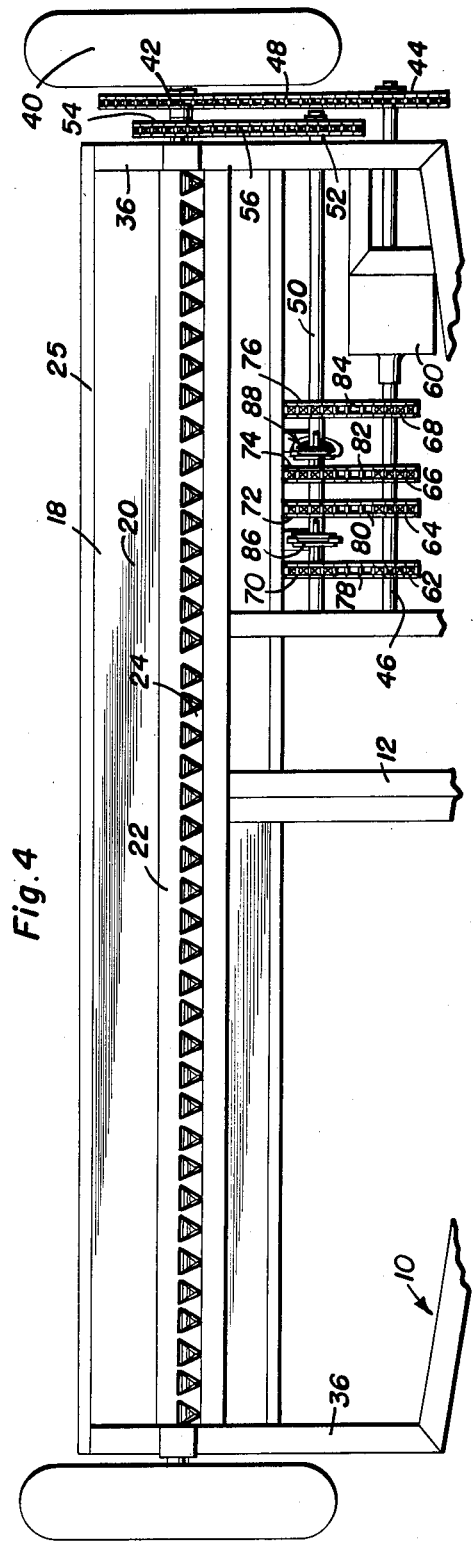
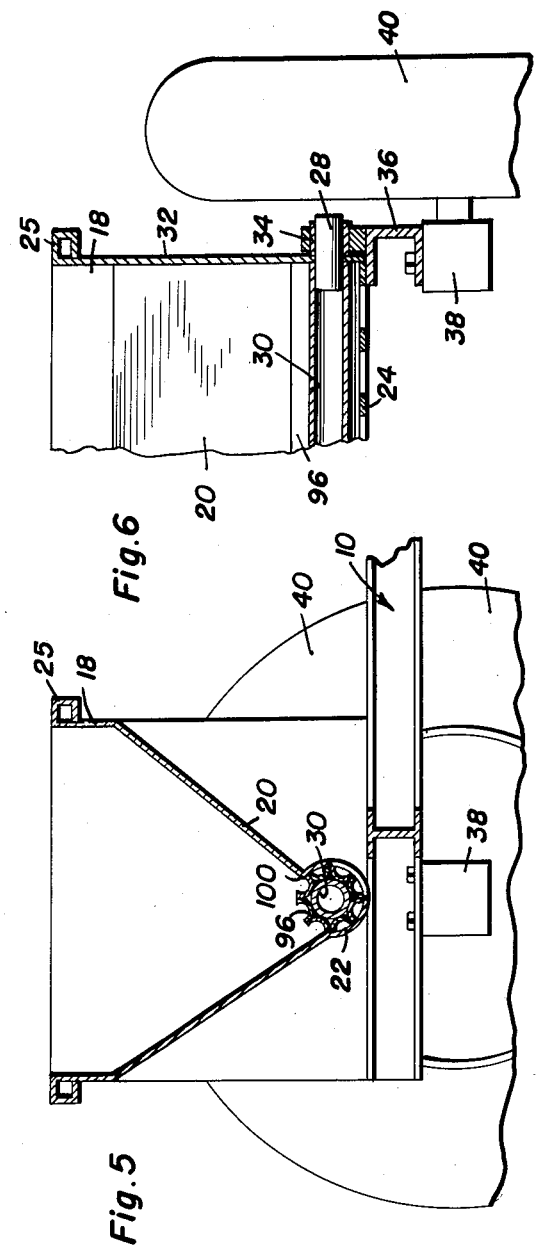
Eugene M. Durand
INVENTOR.

United States Patent Office 2,736,467
Patented Feb. 28, 1956

2,736,467

FERTILIZER SPREADER, INCLUDING VARIABLE SPEED AUGER

Eugene M. Durand, El Centro, Calif.

Application February 19, 1952, Serial No. 272,414

4 Claims. (Cl. 222—177)

This invention relates to new and useful improvements in fertilizer distributors and the primary object of the present invention is to provide an improved fertilizer spreader having novel and improved features over the fertilizer spreader disclosed in my co-pending application, Serial Number 128,170, filed November 18, 1949, now Patent No. 2,673,741.

Another important object of the present invention is to provide a fertilizer spreader including a variable speed auger whereby an operator may control the amount of material or fertilizer leaving the hopper in which the auger is mounted for rotation.

A further object of the present invention is to provide a fertilizer spreader including a hopper having a lower perforated and cylindrical portion in which an auger composed of a plurality of split tubes is mounted for rotation so that the tubes form pockets for conducting the fertilizer toward the perforations or discharge openings in the lower portion of the hopper.

A still further aim of the present invention is to provide a fertilizer spreader including a variable speed auger, which spreader is simple and practical in construction, strong and reliable in use, efficient and durable in operation, inexpensive to manufacture, service and clean, and otherwise well adapted for the purposes for which the same is intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a plan view of the present invention and showing the same applied to the hitch of a tractor;

Figure 2 is an enlarged front elevational view of Figure 1 showing the fertilizer spreader removed from the tractor;

Figure 3 is an enlarged fragmentary end view of Figure 1;

Figure 4 is a bottom plan view of Figure 2;

Figure 5 is an enlarged detailed vertical sectional view taken substantially on the plane of section line 5—5 of Figure 1;

Figure 6 is an enlarged detailed vertical sectional view taken substantially on the plane of section line 6—6 of Figure 1; and, Figure 7 is a perspective view of the auger or combined pulverizing conducting member used in the present invention.

Referring now to the drawings in detail, wherein for the purpose of illustration, there is disclosed a preferred embodiment of the present invention, the numeral 10 represents a wheeled frame having a transversely forwardly extending draft bar 12 secured to its central portion that is adapted to be coupled to a towing vehicle, such as the draw bar element 14 of a tractor 16.

A hopper 18 is suitably secured to the structural members forming the frame 10 and the hopper includes a tapered lower portion 20 terminating in a partial cylinder 22 that is provided with an opening in which longitudinally spaced triangular teeth 24, integral with the cylinder 22, are positioned in order to form a restricted opening for fertilizer discharged from the hopper. The upper end of the hopper 18 is bent to provide a peripheral box channel 25 for reinforcing the hopper structure.

A horizontally disposed auger or combined conveyor and pulverizer member 26 is positioned in partial cylinder 22 for rotation. Plugs or stub shafts 28 are fitted in the ends of these cylindrical portions 30 of member 26, extend through apertures in the end walls 32 of the hopper and are journaled for rotation in bearings 34 on the end members 36 of the frame 10.

The end members 36 support stub axle members 38 on which ground wheels 40 are mounted. One of the ground wheels carries a sprocket 42 that is connected to a sprocket 44 on a forward horizontal shaft 46 by a sprocket chain 48. A second horizontal shaft 50 carries a sprocket 52 that is connected to a sprocket 54 on one of the plugs 28 by a sprocket chain 56. Both shafts 46 and 50 are journaled for rotation in bearings, such as 58, mounted on the frame 10.

The shaft 46 is in two sections that are operatively connected together through the medium of a suitable vehicle transmission 60 having preferably three speeds. The shaft 46 has a series of similar sized sprockets 62, 64, 66 and 68 keyed thereon and these sprockets are connected to a series of various sized sprockets 70, 72, 74 and 76 journaled on the shaft 50 by sprocket chains 78, 80, 82 and 84.

A pair of clutch elements 86 and 88 are slidably keyed on the shaft 50. The clutch element 86 is located between the sprockets 78 and 80, and the clutch element 88 is located between the sprockets 82 and 84. Each of the clutch elements supports a horizontal pin 90 and each of the sprockets is formed with an opening 92 to accommodate the pin of its associated clutch element.

Pivotal hand levers 94 are carried by the hopper and are slidably pivotally attached to the clutch element so that the clutch element 86 may be selectively engaged with the sprockets 78 and 80, whereby the clutch element 88 may be selectively engaged with the sprockets 82 and 84. In this matter, many different speeds of the shaft 50 are possible.

The member 26 includes a plurality of circumferentially spaced split tubes or half tubes 96 whose convex surfaces are fixed by welding of the like to the periphery of the cylinder 30. The tubes 96 extend throughout the length of the cylinder 30 and the adjacent edges of the adjacent tubes are fixed together by welding or the like, so that member 26 will appear as shown thus in Figure 7 of the drawings.

In practical use of the present invention, the tubes 96 will be in close contact with the concave surface of the portion 22 and form pockets for receiving and conducting material in the hopper toward the space between adjacent teeth or blocking portions 24. As the member 26 is rotated the edges of the tubes 96 will ride against the juncture 100 between portion 22 and tapered portion 20 in order to permit only a predetermined amount of fertilizer to be retained in a pocket forming member 96 as the member 26 is moved toward the longitudinally spaced openings in the lower periphery of portion 22.

Having described the invention, what is claimed as new is:

1. A fertilizer spreader attachment for tractors comprising a wheeled frame, a hopper supported on the frame and having a bottom provided with discharge openings, a power driven cylinder in the hopper, bearings supported on the frame at the ends of the hopper, tubes fitted in the ends of the cylinder and journaled for rotation in the bearings, a plurality of circumferentially spaced half tubes having their convex surfaces fixed to the outer periphery of said cylinder, said frame including a ground wheel, and a variable speed connection between said ground wheel and said cylinder, said variable speed connection including a pair of spaced parallel shafts rotatably supported on the frame, one of said shafts being connected to the wheel and the other of said shafts being connected to the cylinder, a group of various sized sprockets keyed on the said one of said shafts, a second group of various sized sprockets journaled on the said other shaft, chains connecting the sprockets of the first group to the sprockets of the second group, and clutch elements slidably keyed on said other shaft for engaging the sprockets of the second group.

2. The combination of claim 1 wherein each of said clutch elements includes a pin paralleling the shafts, each of said clutch elements being located between a pair of sprockets of the second group, each sprocket of said pair having openings for selectively receiving the pin.

3. In a fertilizer distributor including a frame having a ground wheel and a horizontally disposed conveyor member, a pair of spaced parallel shafts rotatably supported on the frame, one of said shafts being operatively connected to the ground wheel and the other of said shafts being connected to the conveyor member, a first series of various sized sprockets keyed on the said one of said shafts, a second series of various sized sprockets journaled on said other of said shafts, sprocket chains connecting the first series of sprockets to the second series of sprockets, the sprockets of the second series being arranged in two pairs, a clutch element slidably keyed to the said other of said shafts between each pair of said sprockets, a pin carried by each clutch element and extending from each side thereof, and the sprockets of each pair having openings for selectively accommodating the pin of their associated clutch element.

4. A fertilizer spreader attachment for tractors comprising a wheeled frame, a hopper supported on the frame and having a bottom provided with discharge openings, a power driven cylinder in the hopper, bearings supported on the frame at the ends of the hopper, tubes fitted in the ends of the cylinder and journaled for rotation in the bearings, a plurality of circumferentially spaced half tubes having their convex surfaces fixed to the outer periphery of said cylinder, said frame including a ground wheel, and a variable speed connection between said ground wheel and said cylinder, said variable speed connection including a pair of spaced parallel shafts rotatably supported on the frame, one of said shafts being connected to the wheel and the other of said shafts being connected to the cylinder, a group of various sized sprockets keyed on the said one of said shafts, a second group of various sized sprockets journaled on the said other shaft, chains connecting the sprockets of the first group to the sprockets of the second group, and clutch elements slidably keyed on said other shaft for engaging the sprockets of the second group, and a speed varying means interposed in said one shaft for varying the rotational speed of said one shaft and the group of sprockets mounted thereon.

References Cited in the file of this patent

UNITED STATES PATENTS

| Number | Name | Date |
|---|---|---|
| 2,340,107 | Gandrud | May 30, 1944 |
| 2,354,235 | Walton | July 25, 1944 |
| 2,508,195 | Seaman et al. | May 16, 1950 |
| 2,511,514 | Rosselot | June 13, 1950 |
| 2,522,693 | Stiteler | Sept. 19, 1950 |
| 2,566,579 | Nichols | Sept. 4, 1951 |
| 2,605,935 | Huitema | Aug. 5, 1952 |
| 2,630,954 | Gandrud | Mar. 10, 1953 |